June 25, 1968  C. M. TARTER ET AL  3,389,453
TIRE INSTALLATION TOOL
Filed Feb. 1, 1967
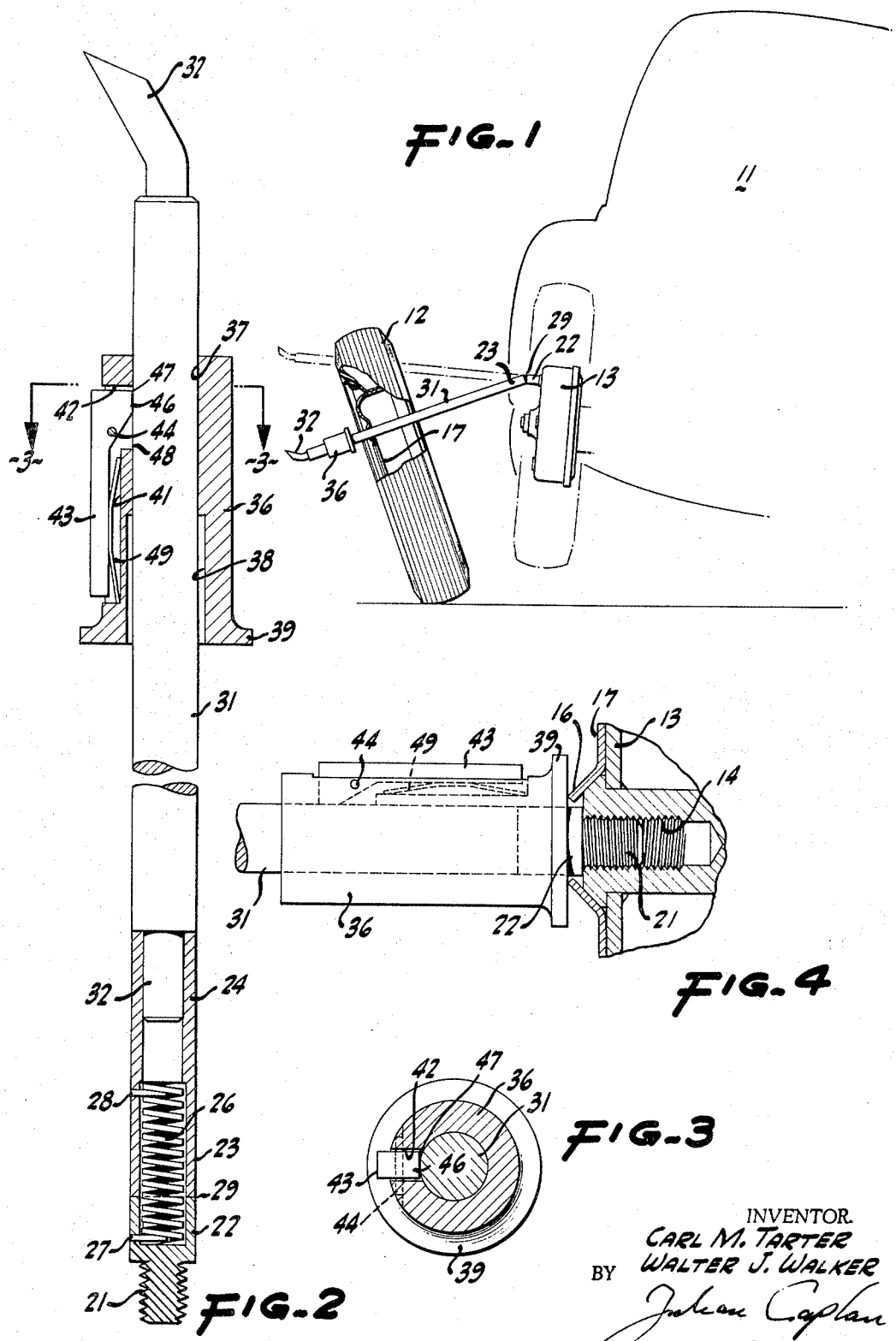
INVENTOR.
CARL M. TARTER
WALTER J. WALKER
BY
ATTORNEY 3,389,453
TIRE INSTALLATION TOOL
Carl M. Tarter, 3275 Wallace Creek Road, and Walter J. Walker, 5774 W. Dry Creek Road, both of Healdsburg, Calif. 95448
Filed Feb. 1, 1967, Ser. No. 613,275
5 Claims. (Cl. 29—273)

ABSTRACT OF THE DISCLOSURE

A rod-like tool has a threaded end for engagement with the threads in a brake drum or studs provided for securing an automobile wheel in place. A flexible joint is spaced a short distance from the end. The diameter of the tool is sufficiently small to pass through a bolt hole in the wheel. When an automobile wheel is to be installed, the threaded end is engaged with the drum and the rod passed through one of the holes in the wheel disk, the flexible joint bending downward when the wheel is on the ground. By lifting up on the outer end of the tool, the wheel slides into place with little manual effort. A slidable handle is used to hold the wheel in position while the lug studs or nuts are being installed.

---

This invention relates to an automobile wheel changing tool which may be used for rapid and effortless raising of a wheel from the ground to the level of the drum without danger to the operator. During the lifting operation, it is unnecessary for the hands to engage the wheel nor is it necessary to kneel on the ground and hence the hands and clothing of the operator do not become soiled as in usual tire changing operations.

A principal feature of the invention is the reduction of manual effort required to life the wheel into place, making it convenient for women to change vehicle wheels.

Volkswagen brake drums have threaded holes which receive lug bolts fitting through holes in the wheel disk whereas most automobiles of American manufacture are provided with studs in the brake disk which are engaged by nuts on the outside of the wheel disk. In the present invention one end of the tool hereinafter described is formed as a stud and is illustrated and hereinafter described constructed with a stud end for engagement with the Volkswagen-type brake drum, but by replacing the stud with a sleeve on the tool it may be used with an American-type wheel construction. In the Volkswagen construction, installation of the wheel is particularly difficult in that until the first bolt is inserted, there is no means for holding the wheel in elevated position. The present invention provides a convenient means for both raising the wheel from the ground and holding the wheel in proper elevation until the first bolt is installed.

A further feature of importance in the present invention is the provision of the handle which slides along the rod-like portion of the tool and can be locked in place in any position of its movement. Such handle may be used to push the wheel up the sloping handle and further may be used to hold the wheel in place in proximity to the drum while the bolts are being installed.

A further feature of the invention is the fact that the handle may be used as a portion of the jack handle and further may be used to remove the hubcap from the wheel.

Although the invention is illustrated and described used to change the wheel of a passenger automobile, a larger version of the tool may be used for truck wheels or the wheels of industrial machines. Such large wheels may be mounted by one man, using the present invention. Various size wheels may be accommodated by forming the handle to receiving interchangeable heads of various sizes.

Other objects of the present invention will become apparent upon reading the following specification and referring to the accompanying drawings in which similar characters of reference represent corresponding parts in each of the several views.

In the drawings:
FIG. 1 is a partially schematic view showing in solid lines commencement of the use of the tool in lifting the vehicle wheel into place and in dot and dash lines the completion of the operation.
FIG. 2 is an enlarged view partly broken away in section showing the tool.
FIG. 3 is a transverse sectional view taken substantially along the line 3—3 of FIG. 2.
FIG. 4 is a fragmentary view partially broken away in section showing portions of the tool, wheel and brake drum when the wheel is in place.

In changing the wheel of a vehicle 11 a jack is used to raise one side or corner of the vehicle so that the axle is tilted upward and the wheel is lifted off the ground. As shown in FIG. 1 in solid lines, the wheel 12 is resting on the ground and must be raised to an elevated position into contact with the brake drum 13. In the Volkswagen-type vehicle shown, drum 13 is formed with a plurality of internally threaded holes 14 which are ultimately engaged with a lug stud bolt which passes through hole 16 in the disk 17 of the wheel. The tool which is the subject of this invention facilitates the foregoing operation. One end 21 of the tool is a stud to mate with the threads 14. Immediately outwardly of end 21 is a enlarged external diameter hollow portion 22 which butts against the hollow end 23 of connecting portion 24. The internal diameter of portion 23 is slightly larger than that of portion 24 and is the same as that of portion 22. A helical spring 26 is installed in the cavity of portions 22 and 23 and the ends 27, 28 of spring 26 project out through holes in portion 22, 23 respectively or the spring is otherwise secured against displacement as by welding or other suitable means. A joint 29 exists between portions 22 and 23 and by reason of the fact that spring 26 is flexible, the tool can bend at joint 29 as is shown in the solid line portions of FIG. 1. A solid handle 31 of extended length is provided with a reduced diameter end 32 which fits into the hollow end portion 24. The outside diameter of portions 31, 24, 23 and 22 are all slightly less than the diameter of the hole 16 so that the wheel disk 17 may be slid along the exterior of the tool. The outer end 32 of the tool may be bent and sharpened for use in removing a hubcap, and the end 32 may be used in a jack and the portion 31 used in the jack handle. As has previously been mentioned, in automobiles of American manufacture, the brake drum disk 13 is formed with lug studs and for such purpose end 21 may be replaced with an internal portion for engagement with such studs.

To facilitate lifting wheel 12 and to hold it in position, a handle 36 may be provided. Handle 36 has an internal bore 37 slightly greater than the diameter of rod 31 formed with a counterbore 38 at the inner end. An external flange 39 is formed at the inner end to facilitate movement of the handle 36 along the rod 31. By sliding handle 36 along rod 31, the wheel 12 may be pushed up the sloping rod into place.

Handle 36 is formed with a narrow longitudinally extending slot 41 intermediate its ends and at the outer end, slot 41 is of greater depth and communicates with bore 37 as is indicated by reference numeral 42. Fitting in slot 41 is a locking lever 43 which is pivoted to handle 36 by pin 44 adjacent its outer end. Projection 46 on the outer end of lever 43 fits against rod 31 and has relatively sharp corners 47, 48 which engage rod 31 and when thus engaged prevent movement of handle 36. A leaf spring 49, which is bent so as to apply outward pressure on lever 43, is located in slot 41 and biases the projection 46 into engagement with rod 31. When the operator grips handle 36, the lever 43 projecting outwardly is normally engaged by the hand and depressed against the force of spring 49 thereby releasing the handle for movement. However, when the grip of the operator is relaxed, spring 49 forces lever 43 outward and holds the handle in fixed position along rod 31.

In use, at the commencement of operations, rod 31 is disengaged from portion 24 and may be used as a jack handle or its end 32 may be used to remove the hubcap if desired. After the original wheel has been removed, the threaded end 21 is fitted into the hole 14 of drum 13, the particular hole 14 selected preferably being that which is uppermost. Wheel 12 is then brought into position and the rod 31 passed through one of the holes 16 therein, with handle 36 on the outside as shown in FIG. 1. The end 32 of rod 31 is fitted into the portion 24 and the joint 29 bent at about the angle shown in FIG. 1. Thereupon the rod 31 is lifted with one hand and the handle 36 pushed inward with the other, the disk 17 sliding along the handle 36 until the wheel reaches the elevated dot and dash position shown in FIG. 1 with disks 17 and 13 in contact. The lever 43 is released, holding the wheel in position. Thereupon bolts may be installed in the other holes 14, securing the wheel in place. Thereafter the tool is removed from the hole 14 with which it is connected and the last bolt installed.

What is claimed is:

1. A wheel installing tool comprising, an elongated rod-like member threaded at one end, a flexible, universal-type joint adjacent said one end, a handle slidable along said rod-like member, and locking means on said handle engageable with said rod-like member to lock said handle at a plurality of positions along said rod-like member, whereby said handle and said threaded end cooperate to retain a wheel against a wheel drum.

2. A tool according to claim 1 in which said rod-like member comprises a first part at said one end containing said flexible joint and an elongated second part detachably connected to said first part, the exteriors of said first and second parts being smooth and when attached together comprising a continuous smooth surface for free sliding of a vehicle wheel.

3. A tool according to claim 1 in which said second part is formed at its outer end with a hub-cap removing blade.

4. A tool according to claim 1 in which said first part comprises a first and a second section, each tubular, said first section threaded at said one end, said flexible joint comprising a spring received in both said sections, said sections normally held by said spring aligned with each other.

5. A tool according to claim 4 in which said second section and said second part are shaped to interfit when said first and second parts are attached together.

References Cited

UNITED STATES PATENTS

| | | | |
|---|---|---|---|
| 955,790 | 4/1910 | Givens | 29—273 |
| 2,499,758 | 3/1950 | Kayfetz | 29—273 |
| 2,555,698 | 6/1951 | Masheck | 29—273 |
| 2,896,315 | 7/1959 | Dubberke | 29—273 X |

FOREIGN PATENTS 47,296 4/1933 Denmark.

OTHELL M. SIMPSON, *Primary Examiner.*

R. V. PARKER, JR., *Assistant Examiner.*